US012087533B2

(12) United States Patent
Lanes

(10) Patent No.: US 12,087,533 B2
(45) Date of Patent: Sep. 10, 2024

(54) ELECTROMAGNETIC ACTUATOR AND METHOD FOR CONTROLLING AN ELECTROMAGNETIC ACTUATOR

(71) Applicant: Schneider Electric Industries SAS, Rueil Malmaison (FR)

(72) Inventor: David Lanes, Saint Hilaire du Touvet (FR)

(73) Assignee: Schneider Electric Industries SAS, Rueill Malmaison (FR)

( * ) Notice: Subject to any disclaimer, the term of this patent is extended or adjusted under 35 U.S.C. 154(b) by 268 days.

(21) Appl. No.: 17/583,267

(22) Filed: Jan. 25, 2022

(65) Prior Publication Data

US 2022/0238289 A1 Jul. 28, 2022

(30) Foreign Application Priority Data

Jan. 27, 2021 (FR) ....................................... 2100759

(51) Int. Cl.
*H01H 51/10* (2006.01)
*H01H 50/20* (2006.01)
*H01H 50/36* (2006.01)

(52) U.S. Cl.
CPC ............ *H01H 51/10* (2013.01); *H01H 50/20* (2013.01); *H01H 50/36* (2013.01)

(58) Field of Classification Search
CPC ......... H01H 51/10; H01H 50/20; H01H 50/36
USPC .......................................................... 307/140
See application file for complete search history.

(56) References Cited

U.S. PATENT DOCUMENTS 6,819,014 B2 * 11/2004 Lo .......................... H01H 47/32
307/140
2003/0160517 A1 8/2003 Lo et al.

FOREIGN PATENT DOCUMENTS

DE 3530966 A1 3/1987
EP 3185272 A1 6/2017

OTHER PUBLICATIONS

French Search Report and Written Opinion dated Oct. 22, 2021 for corresponding French Patent Application No. 2100759, 6 pages.

* cited by examiner

*Primary Examiner* — Hal Kaplan
(74) *Attorney, Agent, or Firm* — Locke Lord LLP

(57) ABSTRACT

A method for controlling an electromagnetic actuator including: applying a first control strategy in which first and third switches are kept in a closed state, whereas a second switch is switched between its open and closed states; detecting an occurrence of overconsumption of current in a coil of the actuator, by detecting that voltage measured on a control bus has exceeded a predefined voltage limit or by detecting that a duty cycle of the second switch has dropped below a threshold value; and in response, applying a second control strategy, instead of the first control strategy, in which the third switch is periodically opened in order to decrease the current supplied to the coil.

8 Claims, 4 Drawing Sheets

ELECTROMAGNETIC ACTUATOR AND METHOD FOR CONTROLLING AN ELECTROMAGNETIC ACTUATOR

TECHNICAL FIELD

The present invention relates to an electromagnetic actuator and to a method for controlling an electromagnetic actuator.

BACKGROUND

As is known, many electrical switching units, such as contactors, include an electromagnetic actuator allowing mobile electrical contacts to be moved between an open position and a closed position.

Generally, the electromagnetic actuator includes a coil configured to generate a magnetic field when it is excited by an electrical power supply circuit. Such an electrical power supply circuit generally includes a switched-mode power supply including one or more transistors which are controlled so as to excite the coil with an excitation signal comprising a sequence of current pulses.

Such electromagnetic actuators must generally meet contradictory demands in relation to power consumption, on the one hand, and the cost of manufacture, on the other hand, which must both remain limited.

However, in practice, it is difficult to construct actuators which meet these two demands at once.

For example, solutions including a coil which is associated with a transformer of flyback type allow low consumption of electricity (for example lower than 2.3 A) to be achieved, but this is done at the expense of the cost of manufacture, which remains high.

Conversely, solutions comprising two distinct coils are inexpensive to manufacture, but the consumption of the system is then considerably increased, and may be more than twice the consumption of the solution with one coil.

SUMMARY

It is these drawbacks which the invention more particularly aims to remedy by providing an electromagnetic actuator exhibiting both low power consumption and a moderate cost of manufacture.

To this end, one aspect of the invention relates to a method for controlling an electromagnetic actuator, including a coil, an electrical power supply circuit for supplying power to the coil, and an electronic control circuit, the power supply circuit including a switching stage comprising an H-bridge comprising a plurality of switches connected to the coil,

- the first switch being connected in a first leg of the bridge between an electrical ground of the power supply circuit and the coil, the second switch being connected between the voltage bus and the coil in a second leg of the H-bridge, and the third switch being connected between the coil and the electrical ground in a third leg of the bridge,
- the control method including steps comprising:
  - applying a first control strategy in which the first and third switches are kept in a closed state, whereas the second switch is switched between its open and closed states;
  - detecting an occurrence of overconsumption of current in the coil, by detecting that the voltage measured on the control bus has exceeded a predefined voltage limit or by detecting that the duty cycle of the second switch has dropped below a threshold value;
  - in response, applying a second control strategy, instead of the first control strategy, in which the third switch is periodically opened in order to decrease the current supplied to the coil.

By virtue of the invention, when the voltage of the DC bus exceeds a predetermined threshold, a specific control strategy is put in place in order to lower the coil current until it returns to below the limit, while at the same time continuing to control the coil so as to ensure normal operation of the actuator.

According to advantageous but non-mandatory aspects, such an electromagnetic actuator may incorporate one or more of the following features, taken in isolation or in any technically permissible combination.

- When the second control strategy is applied, the measured voltage is once more compared with the value of the voltage limit, so as to detect whether or not the measured voltage has returned to below the voltage limit, in order to be able, where applicable, to halt the second control strategy and once more apply the first control strategy.
- In the second control strategy, the duty cycle of the control signal for the second switch is given by the following formula:

$$aSW2=ToffSW3\times(Vdc-Vd)+T(Vd-Ri)/(T\times(Vdc+Vd))$$

- where TSW3off is the time for which the third switch remains open during each period, Ri is equal to the current flowing through the coil Bob multiplied by the intrinsic resistance of the coil, and T is the periodicity of the control signal for the second switch.
  - In the second control strategy, the duty cycle of the control signal for the third switch remains constant or may vary over time.
  - The switches are transistors.
  - The current flowing through the coil is measured by means of a measurement device, which is preferably associated with the third transistor.

According to another aspect, the invention relates to an electromagnetic actuator, including a coil, an electrical power supply circuit for supplying power to the coil, and an electronic control circuit, the power supply circuit including a switching stage comprising an H-bridge comprising a plurality of switches connected to the coil, the first switch being connected in a first leg of the bridge between an electrical ground of the power supply circuit and the coil, the second switch being connected between the voltage bus and the coil in a second leg of the H-bridge, and the third switch being connected between the coil and the electrical ground in a third leg of the bridge, the electronic control circuit being programmed to implement steps including:

- applying a first control strategy in which the first and third switches are kept in a closed state, whereas the second switch is switched between its open and closed states;
- detecting an occurrence of overconsumption of current in the coil, by detecting that the voltage measured on the control bus has exceeded a predefined voltage limit or by detecting that the duty cycle of the second switch has dropped below a threshold value;
- in response, applying a second control strategy, instead of the first control strategy, in which the third switch is periodically opened in order to decrease the current supplied to the coil.

BRIEF DESCRIPTION OF THE DRAWINGS

The invention will be better understood and other advantages thereof will become more clearly apparent in light of the following description of one embodiment of an electromagnetic actuator, given solely by way of example and made with reference to the appended drawings, in which.

DETAILED DESCRIPTION

Figure 1:
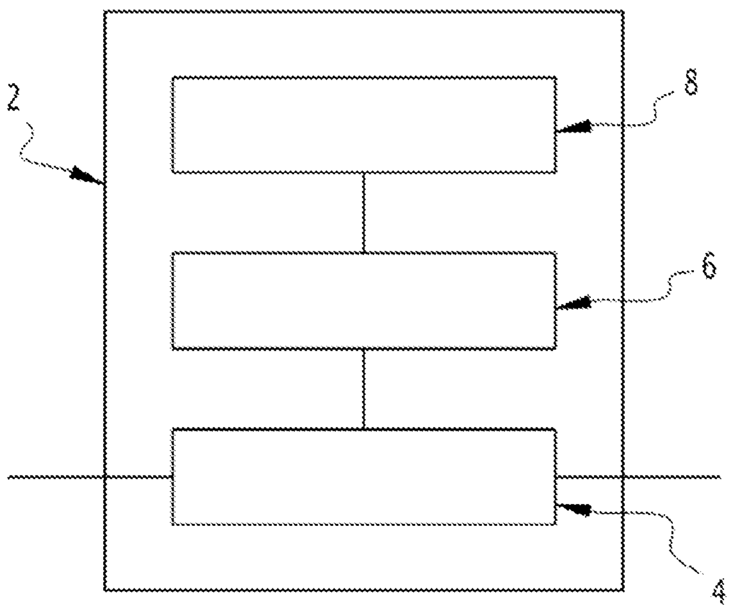
FIG. 1 schematically shows an electrical switching unit including an electromagnetic actuator in accordance with the invention.

FIG. 1 schematically shows an electrical switching unit 2 such as a contactor, or a relay, or a circuit breaker, or any equivalent unit.

The unit 2 here comprises mobile electrical contacts 4 which, according to whether they are in the open or closed position, block the electric current from flowing between terminals of the unit 2 or, conversely, allow this current to flow.

According to some examples, the unit 2 may be a multipolar unit, or a unipolar unit, and thus includes as many pairs of terminals as phases.

The unit 2 also includes an electromagnetic actuator including a coil, an electrical power supply circuit 6 configured to supply power to the coil and an electronic control circuit 8. In what follows, the actuator may be denoted by the reference "6".

The actuator 6 is coupled to the mobile contacts 4, for example by means of mechanical or electromagnetic coupling, and allows the mobile contacts 4 to be moved, directly or indirectly, according to whether or not the coil is supplied with power.

The electronic control circuit 8 is configured to control the operation of the actuator, as will be seen below.

For example, the electronic control circuit 8 includes a processor, such as a programmable microcontroller or a microprocessor.

The processor is, for example, coupled to a computer memory, or to any computer-readable data storage medium, which includes executable instructions and/or software code intended to implement a control method such as that described below.

According to some variants, the electronic control circuit 8 may include other elements, such as a digital signal processor (DSP), or a field-programmable gate array (FPGA), or an application-specific integrated circuit (ASIC), or any equivalent element.

Figure 2:
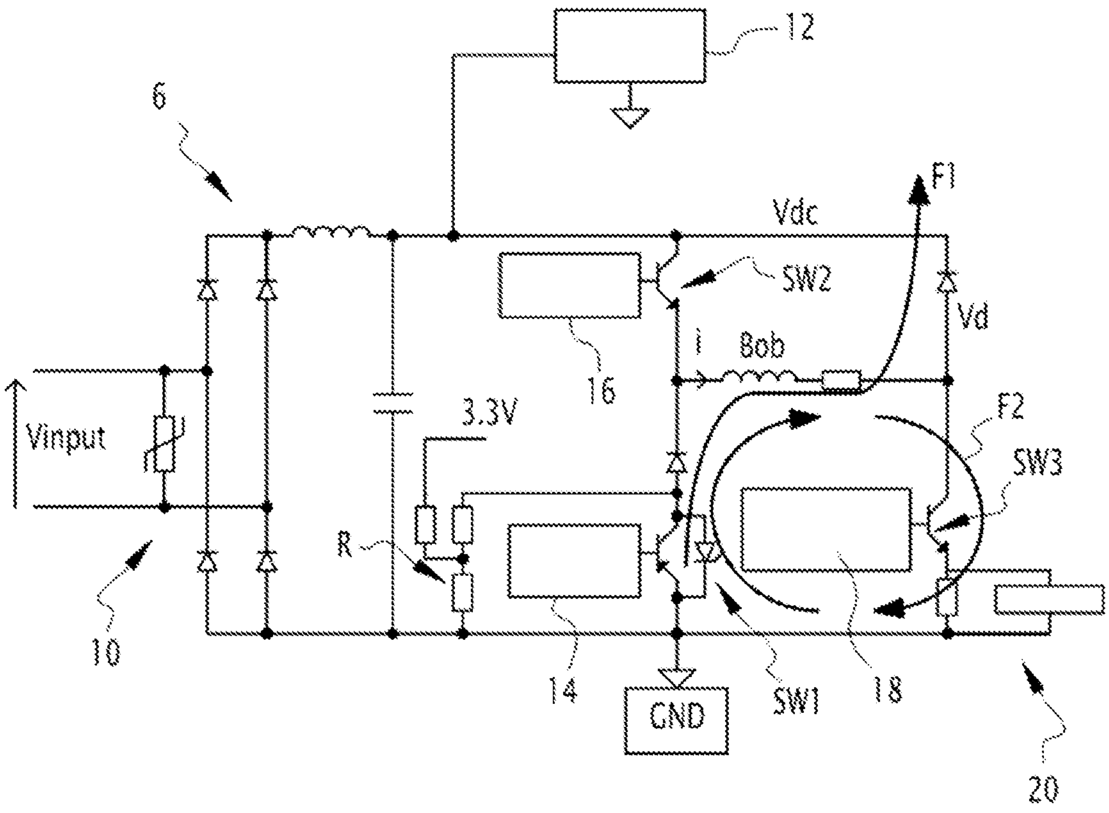
FIG. 2 schematically shows an electrical power supply circuit of the electromagnetic actuator of FIG. 1.

FIG. 2 shows one exemplary embodiment of the actuator 6.

The actuator 6 includes a coil "Bob" and an electrical power supply circuit configured to deliver an electrical excitation current (coil current) to the coil in order to excite the latter, for example so as to generate a magnetic field acting on the position of the mobile contacts 4.

For example, the electrical power supply circuit includes an input stage 10 which receives an input electric voltage Vinput which is, for example, delivered between input terminals by an electricity source.

The input stage 10 may include a rectifier, such as a diode bridge, and means for protecting against overvoltages or overcurrents. The input stage 10 may also include filtering means, such as a filter capacitor.

The power supply circuit also includes, downstream of the input stage, a DC voltage bus Vdc comprising a first conductive line and a second conductive line which is connected to an electrical ground GND of the circuit. A linear voltage regulator 12 is here connected to the first line of the voltage bus.

The power supply circuit also includes a switching stage comprising an H-bridge comprising a plurality of switches connected to the coil Bob.

For example, the coil Bob is connected between a first point and a second point, which form the mid-points of the H-bridge. The excitation current which flows through the coil is here denoted "i". The coil Bob is configured to be coupled with a mobile element of the actuator, such as a mobile blade, for example so as to move the mobile contacts 4. The coil Bob includes an internal resistance associated with its structure and which is illustrated as a resistor R connected in series between a first point and a second point.

Preferably, a single coil is connected between the first point and the second point in the H-bridge. In other words, there is no second coil connected in series with the coil Bob and coupled with a mobile element of the actuator 6.

For example, the switching stage includes three power switches SW1, SW2 and SW3, here each associated with a branch of the H-bridge.

A first switch SW1 is connected between the ground GND and the first point, forming a first leg of the H-bridge.

The switch SW1 ("fast-falling switch") is here connected in parallel with a flyback clipping diode, and in series with another diode placed between the switch SW1 and the first point.

A second switch SW2 ("high-side switch") is connected between the first point of the H-bridge and the first line of the voltage bus Vdc.

A third switch SW3 ("low-side switch") is connected between the second point of the H-bridge and the electrical ground.

For example, the switches are transistors, preferably conventional transistors, such as power transistors, or MOSFETs, or any appropriate transistor.

For example, the fourth leg of the H-bridge may include a diode connected between the second point and the first conductive line. The voltage across the terminals of this diode is denoted Vd.

The switches SW1, SW2 and SW3, and in particular the switches SW2 and SW3, are controlled by the control circuit 8, for example so as to supply the coil with pulses of electric current, in order to place the coil in an excited (inrush) state and/or keep the coil in an excited state.

For example, in each switch, a control electrode is configured to receive a control signal transmitted by the control circuit 8.

Optionally, in certain embodiments, the circuit 6 may include a diagnostic module connected in parallel with the transistor SW1, this module being configured to measure a voltage representative of the current which flows through the transistor SW1, for example by means of a bridge of resistors R. This diagnostic module may, however, be omitted.

In the diagram of FIG. 2, the blocks 14, 16 and 18 represent, in a simplified manner, the control modules, or drivers, which control the transistors SW1, SW2 and SW3, respectively. It is understood that these control modules 14, 16 and 18 may form part of the control circuit 8.

The power supply circuit also includes a measurement device 20, here associated with the transistor SW3, which is configured to measure the current which flows through the transistor SW3, for example by means of a measurement resistor connected in series with the transistor SW3, this allowing the image of the current flowing through the coil Bob to be measured. This device 20 ultimately allows the current in the coil to be regulated.

In accordance with the invention, the control circuit 8 is programmed to control the transistors so as to regulate the excitation current of the coil, in particular by keeping the excitation current of the coil under a predefined limit, in order to reduce the power consumption of the actuator.

This strategy may be implemented as soon as there is an occurrence which is likely to represent overconsumption of current in the coil Bob (an "occurrence of overconsumption"), for example when the voltage of the DC bus Vdc exceeds a limit value Vlim, or, equivalently, when the duty cycle of the control of the switch SW2 (the ratio of the closed duration during a period to the total duration of a period, it being understood that the switch SW2 is opened and closed periodically) drops below a predefined threshold value denoted DC_lim.

In other words, the control circuit 8 is configured to implement a plurality of different control strategies.

Figure 3:
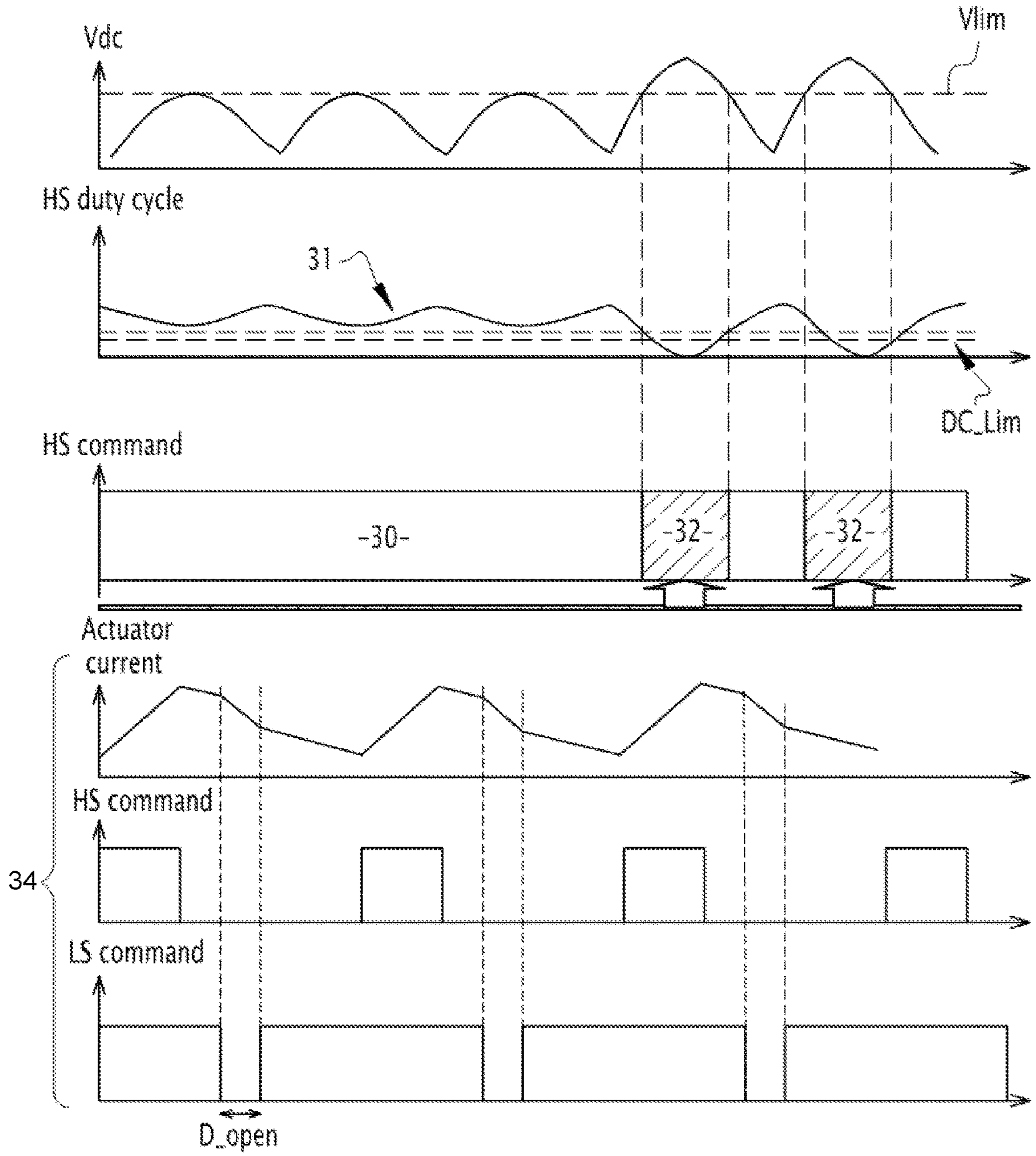
FIG. 3 schematically shows the change in the coil current, in the duty cycle of a switch of the electrical power supply circuit and in control signals over time in the electrical power supply circuit of FIG. 2, according to various control strategies.

FIG. 3 illustrates exemplary operation of the actuator 6.

The graph Vdc illustrates one example of the change in the electric voltage of the voltage bus Vdc over time (x-axis). The dashed line corresponds to the value of the voltage threshold Vlim.

The graph HS_duty_cycle illustrates the change in the duty cycle of the switch SW2 over time (x-axis). The double dashed line corresponds to the threshold value DC_lim.

The graph command_strategy illustrates the control strategy put in place over time (x-axis) by the control circuit 8 according to the value of the voltage Vdc.

For example, a first control strategy 30 (the normal strategy) is put in place for as long as the electric voltage Vdc remains below the limit Vlim.

Preferably, in the first control strategy, the switch SW1 and the switch SW3 are kept closed (i.e. in an on state), so as to allow the current to flow, while the switch SW2 is switched alternately between its open and closed states with a predefined switching frequency.

For example, the duty cycle of the control signal for the switch SW2 (defined as the ratio, for each period, of the duration for which the switch is closed to the total duration of the period) may vary according to operating conditions of the power supply circuit.

In practice, the duration for which the switch SW2 remains closed during each period is less than the time necessary for switching the switch SW2.

According to one advantageous example, the duty cycle aSW2 of the control signal for the switch SW2 is given by the following formula:

$$aSW2 = ToffSW3 \times (Vdc - Vd) + T(Vd - Ri)/(T \times (Vdc + Vd))$$

where ToffSW3 is the time for which the switch SW3 remains open during each period, Ri is equal to the current flowing through the coil Bob multiplied by the value of the internal resistance R of the coil Bob, and T is the periodicity of the control signal for the switch SW2.

A second control strategy 32 is put in place when the electric voltage Vdc exceeds the limit Vlim, and this strategy remains in force until the electric voltage Vdc drops below the limit Vlim. Equivalently, this condition may correspond to the duty cycle of the switch SW2 falling below the threshold value DC_lim.

The portion 34 of FIG. 3 shows in more detail the change over time (x-axis) in the coil current (Actuator current), in the control signal for the transistor SW2 (HS command) and in the control signal for the transistor SW3 (LS command) when the second control strategy 32 is applied by the control circuit 8.

In this second control strategy, the switch SW1 is kept closed, whereas the switch SW2 continues to be switched alternately between its open and closed states with the same predefined switching frequency. However, this time, the switch SW3 is periodically opened in order to decrease the coil current.

Advantageously, the opening of the switch SW3 is synchronized with the opening of the switch SW2 so that the switch SW3 is open at the same time as the switch SW2.

Temporarily opening the switch SW3 allows the rate of variation of the coil current (i.e. the derivative of the current as a function of time) to be increased, and its decrease to therefore be accelerated, preferably until reaching a lower value, allowing the electricity consumption of the actuator to be decreased. For example, when the switch SW3 is open, the flyback current flows through the coil between the ground and the line Vdc following the path shown by the arrow F1 in FIG. 2, for example flowing through the branch of the H-bridge including the switch SW1, then the coil, and then the diode Vd.

Once the switch SW3 is closed once more, the rate of variation of the coil current decreases, this meaning that the coil current stabilizes, preferably at a current value far from its maximum.

For example, when the switch SW3 is closed, the flyback current flows through the coil and the ground following the path shown by the arrow F2 in FIG. 2, for example flowing through the circuit mesh formed by the branch of the H-bridge including the switch SW1, then the coil, and then the branch of the H-bridge including the switch SW3.

In FIG. 3, the open duration of the switch SW3 is denoted "D_open". For example, the duty cycle of the control signal for the switch SW3 remains constant. As a variant, the duty cycle of the control signal for the switch SW3 might be variable.

By way of example, an open duration of 2 μs corresponds to a duty cycle of 96% for a switching frequency of 20 kHz.

Thus, the excitation current of the coil is regulated so as to limit the current flowing through the coil whatever the input voltage is. By virtue of the invention, when the voltage of the DC bus exceeds a preset threshold, a specific control strategy is put in place in order to lower the coil current until it returns to below the limit, while at the same time continuing to control the coil so as to ensure normal operation of the actuator.

In particular, using this architecture coupled with the hybrid control strategy it is possible to use only a single coil without needing to use a flyback transformer in the power supply circuit, and to nevertheless achieve reduced power consumption with respect to the known solutions using two coils.

For example, the starting current (inrush current) is here less than or equal to 2.5 A.

Figure 4:
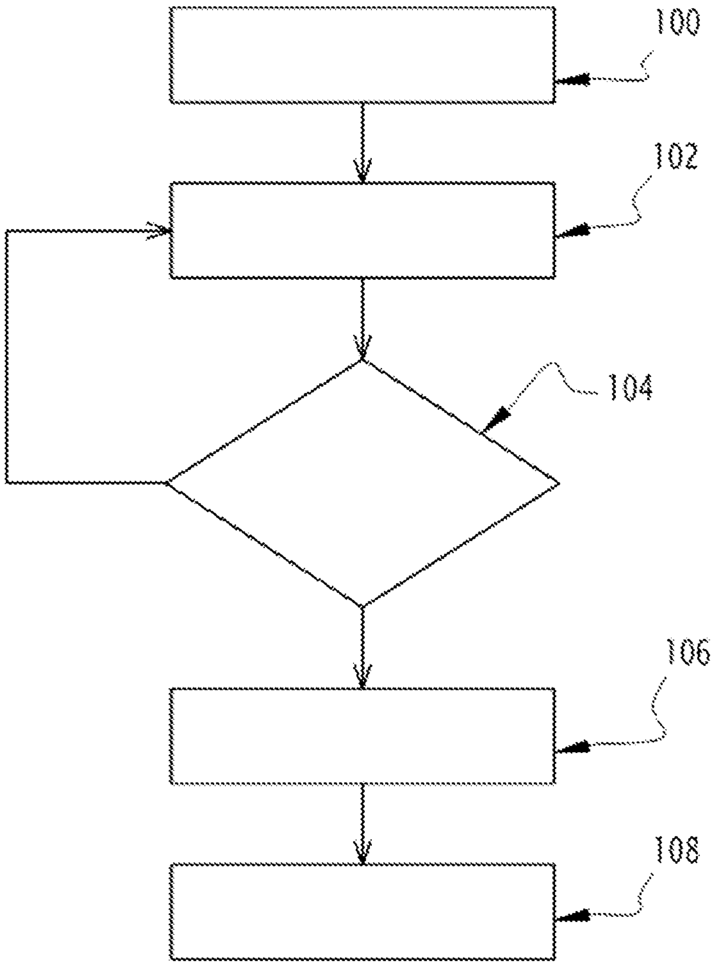
FIG. 4 is a flowchart of a method for controlling the electromagnetic actuator of FIG. 1.

One example of a control method is now described with reference to FIG. 4.

The method starts at the step 100, for example following the reception of an order to excite the coil of the actuator 6.

During a step 102, the control circuit 8 applies the first control strategy so as to control the switches SW1, SW2 and SW3.

In parallel, during a step 104, the control circuit 8 identifies the duty cycle of the switch SW2 and applies the second control strategy when the value of the duty cycle drops below the predefined threshold value DC_lim.

This identification may be performed on the basis of the control signal delivered by the control circuit 8 to the switch, or indeed by other means, for example by measuring the voltage Vdc.

Alternatively, the detection may be performed indirectly, for example by comparing the measured voltage Vdc with the value of the voltage limit Vlim, since the change in the voltage Vdc is associated with the change in the duty cycle of the switch SW2. For example, the voltage Vdc is measured by means of the measurement device 20.

If the measured voltage Vdc is detected as exceeding the voltage limit Vlim, or equivalently if the duty cycle of the switch SW2 is detected as dropping below the threshold value DC_lim, then, during a step 106, the previously described second regulation strategy is implemented instead of the first control strategy. In the event that the measured voltage Vdc does not exceed the voltage limit Vlim, or when the duty cycle of the switch SW2 remains above the threshold value DC_lim, then the first control strategy remains in place.

Next, in the step 108, the control circuit 8 continues to compare the measured voltage Vdc with the value of the voltage limit Vlim, so as to detect whether or not the measured voltage Vdc has returned to below the voltage limit Vlim, or equivalently to compare the determined value of the duty cycle of the switch SW2 with the threshold value DC_lim in order to detect any exceeding of the threshold value DC_lim, in order to be able, where applicable, to halt the second control strategy and once more apply the first control strategy.

In the event that the measured voltage Vdc still exceeds the voltage limit Vlim, or equivalently when the determined value of the duty cycle of the switch SW2 is still below the threshold value DC_lim, then the second control strategy remains in place.

As a variant, the steps might be executed in a different order. Certain steps might be omitted. The described example does not prevent, in other embodiments, other steps from being implemented conjointly and/or sequentially with the described steps.

The embodiments and the variants envisaged above may be combined with one another so as to create new embodiments.

The invention claimed is:

1. A method for controlling an electromagnetic actuator, including a coil, an electrical power supply circuit for supplying power to the coil, and an electronic control circuit, the power supply circuit including a switching stage comprising an H-bridge comprising a plurality of switches connected to the coil, the first switch being connected in a first leg of the bridge between an electrical ground of the power supply circuit and the coil, the second switch being connected between the voltage bus and the coil in a second leg of the H-bridge, and the third switch being connected between the coil and the electrical ground in a third leg of the bridge, the control method comprising:

applying a first control strategy in which the first and third switches are kept in a closed state, whereas the second switch is switched between its open and closed states;

detecting an occurrence of overconsumption of current in the coil, by detecting that the voltage measured on the control bus has exceeded a predefined voltage limit or by detecting that a duty cycle of the second switch has dropped below a threshold value; and in response, applying a second control strategy, instead of the first control strategy, in which the third switch is periodically opened in order to decrease the current supplied to the coil.

2. The method according to claim 1, wherein, when the second control strategy is applied, the measured voltage is once more compared with the value of the voltage limit, so as to detect whether or not the measured voltage has returned to below the voltage limit, in order to be able, where applicable, to halt the second control strategy and once more apply the first control strategy.

3. The method according to claim 1, wherein, in the second control strategy, the duty cycle of the control signal for the second switch is given by the following formula:

$$aSW2=\mathrm{Toff}SW3\times(Vdc-Vd)+T(Vd-Ri)/(Tx(Vdc+Vd))$$

where ToffSW3 is the time for which the third switch remains open during each period, Vdc is the voltage measured on the control bus, Vd is a voltage measured across a diode, Ri is equal to the current flowing through the coil Bob multiplied by the intrinsic resistance of the coil, and T is the periodicity of the control signal for the second switch.

4. The method according to claim 1, wherein, in the second control strategy, the duty cycle of the control signal for the third switch varies over time.

5. The method according to claim 1, wherein the switches are transistors.

6. The method according to claim 1, wherein the current flowing through the coil is measured by means of a measurement device, which is preferably associated with the third transistor.

7. The method according to claim 1, wherein, in the second control strategy, the duty cycle of the control signal for the third switch remains constant.

8. An electromagnetic actuator, including a coil, an electrical power supply circuit for supplying power to the coil, and an electronic control circuit, the power supply circuit including a switching stage comprising an H-bridge comprising a plurality of switches connected to the coil, the first switch being connected in a first leg of the bridge between an electrical ground of the power supply circuit and the coil, the second switch being connected between the voltage bus and the coil in a second leg of the H-bridge, and the third switch being connected between the coil and the electrical ground in a third leg of the bridge, the electronic control circuit being programmed to implement at least:

applying a first control strategy in which the first and third switches are kept in a closed state, whereas the second switch is switched between its open and closed states;

detecting an occurrence of overconsumption of current in the coil, by detecting that the voltage measured on the control bus has exceeded a predefined voltage limit or by detecting that a duty cycle of the second switch has dropped below a threshold value; and in response, applying a second control strategy, instead of the first control strategy, in which the third switch is periodically opened in order to decrease the current supplied to the coil.

* * * * *